United States Patent [19]

Augunas

[11] 4,241,887
[45] Dec. 30, 1980

[54] WINDING PREVENTION MECHANISM FOR SEAT BELT RETRACTOR

[75] Inventor: Algis G. Augunas, Warren, Mich.

[73] Assignee: General Motors Corporation, Detroit, Mich.

[21] Appl. No.: 77,843

[22] Filed: Sep. 21, 1979

[51] Int. Cl.$^3$ ...................... A62B 35/00; B65H 75/48
[52] U.S. Cl. .................................................. 242/107.7
[58] Field of Search ............ 242/107.7, 107.6, 107.12;
280/803–808; 287/474–480

[56] References Cited

U.S. PATENT DOCUMENTS

| | | | |
|---|---|---|---|
| 2,976,959 | 3/1961 | Husted | 242/107.6 X |
| 3,590,656 | 7/1971 | Lloyd | 242/107.7 X |
| 3,858,826 | 1/1975 | Sprecher | 242/107.7 |
| 4,023,746 | 5/1977 | Magyar | 242/107.7 |

*Primary Examiner*—John M. Jillions
*Attorney, Agent, or Firm*—Charles E. Leahy

[57] ABSTRACT

A ratchet wheel carried by a rotatably mounted seat belt reel is selectively engageable by a pawl to prevent belt winding reel rotation and thereby hold the belt extended at a set slackened length about the occupant. The pawl is mounted on the housing in a manner which permits radial movement between ratchet wheel engaging and disengaging positions and for tangential shifting movement between a first limit in the winding direction and a second limit in the unwinding direction. The mounting of the pawl is effective to block radial movement to the engaging position when the pawl is tangentially positioned at the second limit in the unwinding direction. A control disc is frictionally clutched to the reel and has an abutment for shifting the pawl to the first limit upon reel winding and to the second limit upon reel unwinding. The control disc functions to engage the pawl with the ratchet wheel upon initiation of reel unwinding subsequent to a prior reel winding having shifted the pawl to the first limit to unblock the pawl for movement to the engaged position, thereby holding the belt at a slackened length with respect to the occupant. The disc is further effective to move the pawl to the disengaged position upon further reel unwinding and then shift the pawl to the second limit upon engagement by the abutment to again block the pawl in the disengaged position and thereby permit belt winding reel rotation to pull the belt taut against the occupant.

2 Claims, 5 Drawing Figures

WINDING PREVENTION MECHANISM FOR SEAT BELT RETRACTOR

The invention relates generally to a seat belt retractor and more particularly provides a winding prevention mechanism effective in response to predetermined sequence of reel rotation to hold the belt at a set length providing a slackened condition about the occupant.

BACKGROUND OF THE INVENTION

It is recognized in the prior art that utilization of a relatively strong winding spring in the retractor results in a somewhat annoying amount of shoulder belt load across the chest of a seated occupant. It is therefore desirable to provide means for preventing belt winding rotation of the reel by the windup spring so as to relieve the belt tension across the chest of the occupant by introducing slack into the belt.

One such prior seat belt retractor is disclosed in U.S. Pat. No. 4,023,746 issued to Joseph J. Magyar. According to that patent a control disc and a blocking disc are clutched to the reel for rotation therewith and cooperate to control movement of a pawl between positions of engagement and disengagement relative a ratchet wheel attached to the reel. In general, one of the discs is a control disc which controls movement of the pawl between a position engaging the ratchet teeth to prevent reel rotation in the winding direction by the winding spring and a disengaged position permitting reel rotation. The other disc is a blocking disc which is effective to selectively capture and hold the pawl in the disengaged position to thereby deactuate the winding prevention mechanism and restore the winding bias of the spring.

BRIEF SUMMARY OF THE INVENTION

The present invention features a winding prevention mechanism having only a single control disc frictionally clutched to the reel.

According to the invention, a ratchet wheel carried by the reel is selectively engageable by a pawl mounted on the housing. The pawl is mounted on the housing in a manner which permits radial movement between ratchet wheel engaging and disengaging positions and tangential shifting movement between a first limit in the winding direction and a second limit in the unwinding direction. The mounting of the pawl is effective to block radial movement to the engaging position when the pawl is tangentially positioned at the second limit in the unwinding direction. A control disc is frictionally clutched to the reel and has an abutment for shifting the pawl to the first limit upon reel winding and to the second limit upon reel unwinding. The control disc functions to engage the pawl with the ratchet wheel upon initiation of reel unwinding subsequent to a prior reel winding having shifted the pawl to the first limit to unblock the pawl for movement to the engaged position, thereby holding the belt at a slackened length with respect to the occupant. The disc is further effective to move the pawl to the disengaged position upon further reel unwinding and then shift the pawl to the second limit upon engagement by the abutment to again block the pawl in the disengaged position and thereby permit belt winding reel rotation to pull the belt taut against the occupant.

Accordingly, the object, feature, and advantage of the invention resides in the provision of a winding prevention mechanism comprised of a control disc for moving the pawl radially of the ratchet wheel between engaged and disengaged positions and for moving the pawl tangentially between a limit in the unwinding direction in which the pawl is blocked from radial inward movement and a limit in the winding direction in which the pawl is permitted to move radially toward engagement with the ratchet wheel.

BRIEF DESCRIPTION OF THE DRAWINGS

These and other features, objects and advantages of the invention will become apparent upon consideration of the specification and the appended drawings in which.

DETAILED DESCRIPTION OF THE PREFERRED EMBODIMENT

Figure 1:
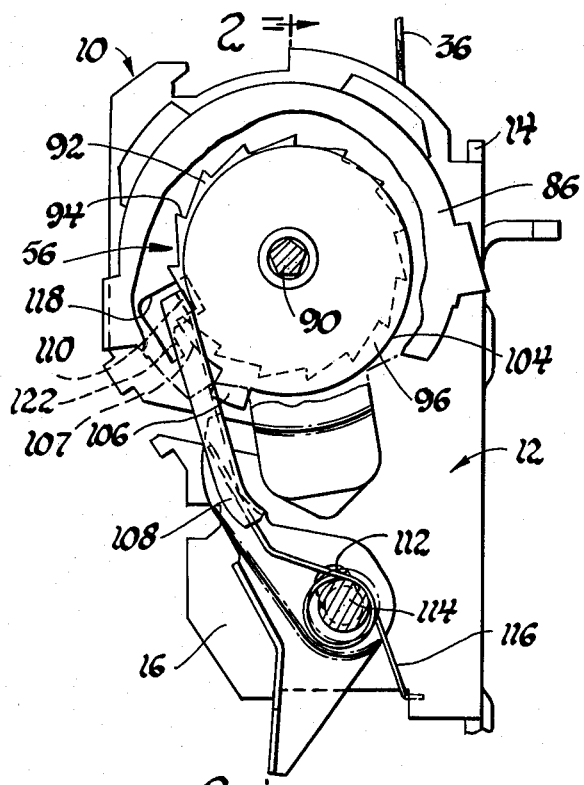
FIG. 1 is a side elevational view of a vehicle occupant restraint belt retractor with the winding prevention mechanism maintaining the belt in an extended position against belt winding reel rotation.
Figure 2:
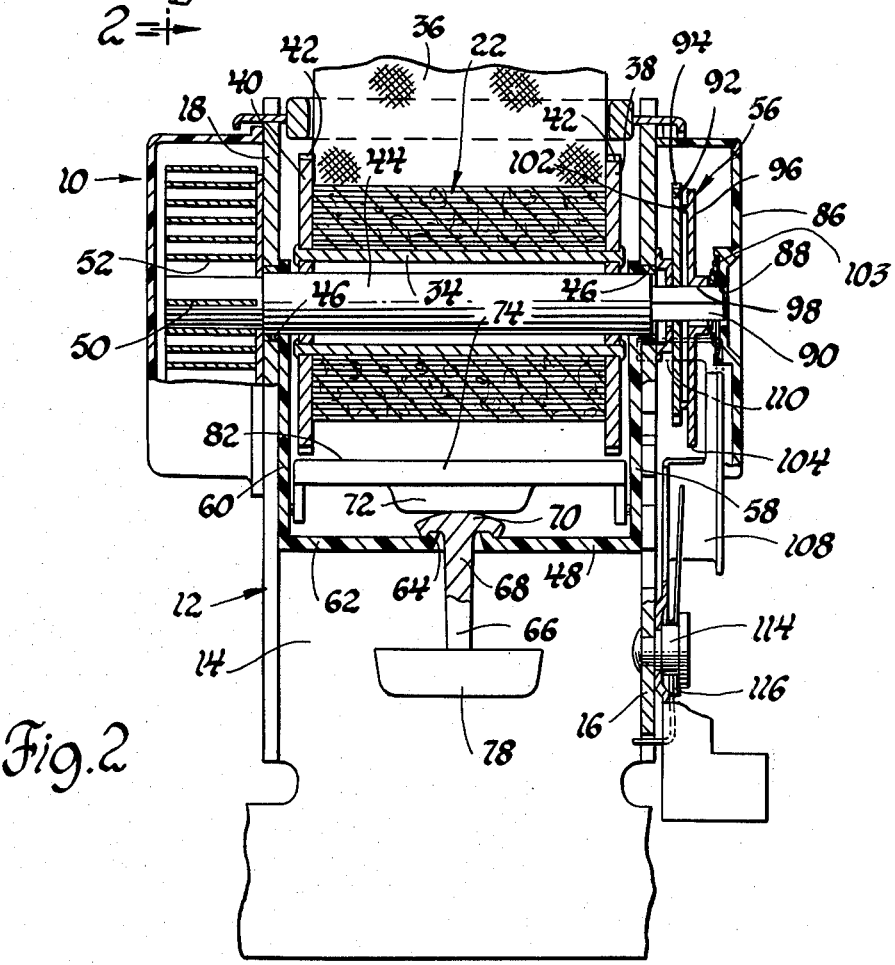
FIG. 2 is a sectional view of the retractor taken in the direction of arrows 2—2 of FIG. 1 and shows the belt reel on which the belt is wound as well as the winding prevention mechanism and a conventional pendulum locking arrangement for locking the reel against belt unwinding reel rotation.

Referring to FIGS. 1 and 2 of the drawing, a vehicle occupant restraint belt retractor is generally indicated by 10 and includes a housing generally designated 12. Housing 12 includes a base wall 14 and spaced parallel side walls 16 and 18.

A belt reel, generally designated 22, includes an elongated drum 34 upon which the belt 36 is wound and ratchet plates 38 and 40 which are suitably fixed to the opposite ends of the drum 34 and have ratchet teeth 42 which face in the belt unwinding direction of reel rotation. The belt unwinding direction is counterclockwise as viewed in FIG. 1. An elongated shaft 44 is received by the belt drum 32 and suitably fixed to the ratchet plates 38 and 40 such as by splining. The ends of the shaft 44 are rotatably supported on the housing side walls 16 and 18 by bushing portions 46 of a pendulum support member 48.

The FIG. 2 left-hand end of shaft 44 extends outwardly through the adjacent housing wall 18 and has a slot 50 which receives the inner end of a spiral or clock spring 52. The outer end of the spring 52, not shown, is suitably fixed to the adjacent housing side wall 18 so that the belt reel 22 is normally biased in a belt winding direction to store the belt 36 on the belt reel 22. The right-hand end of shaft 44 extends outwardly through the adjacent housing side wall 16 and is connected to a winding prevention mechanism, generally designated 56.

The pendulum support member 48 includes depending legs 58 and 60 which extend downwardly from the bushing portions 46 encircling the ends of shaft 44. The lower ends of the legs 58 and 60 are connected by a base 62 which is oriented in a horizontal plane. An aperture 64 in the base 62 receives a stem 66 of pendulum 68. The stem 66 mushrooms outwardly above the base 62 to define a control portion 70 which is engaged by a downwardly extending control portion 72 of a locking member 74. The locking member 74 is pivotally supported between the housing side walls 16 and 18. The pendulum 68 has an inertia weight 78 which swings from the normal vertically depending orientation of FIG. 2 to an inclined position in response to abrupt vehicle acceleration or deceleration in any horizontal direction. Swinging of the pendulum 68 causes the pendulum control portion 70 to pivot the locking member 74 upwardly and thereby carry a locking face 82 of the locking member 74 into simultaneous engagement with the ratchet teeth 42 of ratchet plates 38 and 40. When the vehicle acceleration or deceleration terminates, gravity returns the pendulum 68 to its vertical position, thereby allowing gravity to pivot the locking member 74 downwardly out of engagement with the reel ratchet teeth 42 to permit a subsequent belt unwinding. Since the locking member 74 is the only restraint on unwinding reel rotation, the occupant can normally unwind the belt by leaning forward in the seat or pulling on the belt.

The winding prevention mechanism 56 is housed within a cover 86 fixedly mounted on the housing side wall 16. The central portion of cover 86 defines a bore 88 which rotatably receives a reduced diameter end portion 90 of the shaft 44. The end portion 90 of the shaft is polygonal in shape as best seen in FIG. 1 to fix a ratchet wheel 92 for rotation with the belt reel 22. As seen in FIG. 1 the ratchet wheel 92 is generally circular and has ratchet teeth 94 which face in the clockwise or belt winding direction of reel rotation, oppositely of the ratchet teeth 42 on the ratchet plates 38 and 40.

The winding prevention mechanism 56 also includes a control disc 96 having a central aperture 98 which rotatably receives the end portion 90 of shaft 44. The control disc 96 has an annular rib 102 which faces the ratchet wheel 92. A coil compression spring 103 acts between the cover 86 and the control disc 96 to urge the annular rib 102 into frictional engagement with the ratchet wheel 92 so that the control disc is frictionally clutched to the ratchet wheel 92 for rotation therewith.

As best seen in FIG. 1, the outer peripheral edge of the control disc 96 includes a spiralling cam surface 104, a radially raised abutment 106, and a blocking portion 107 which respectively control the movement of a pawl 108 as will be described hereinafter.

Figure 3:
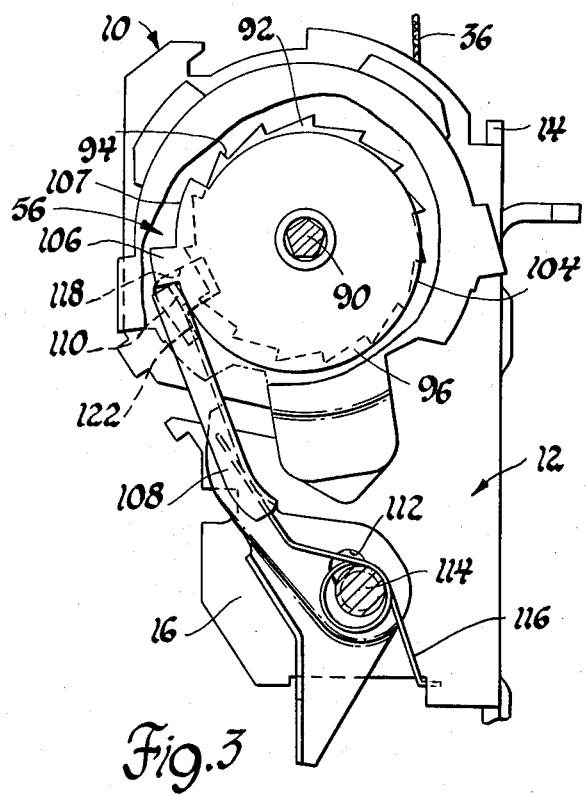
FIG. 3 is similar to FIG. 1 but shows the winding prevention mechanism with the belt unwound substantially from the position of FIG. 1 so that the pawl is raised to a disengaged position.

Referring to FIGS. 1 and 2, it is seen that the pawl 108 is comprised of a sheet metal stamping which overlies the housing side wall 16 and a laterally extending tooth 110 which overlies the ratchet teeth 94 of ratchet wheel 92. The pawl 108 has a slot 112 which surrounds a pivot pin 114 on the side wall 16 to mount the pawl for pivotal movement radially of the ratchet wheel 92 to carry the pawl tooth 110 between an engaged position of FIG. 1 and disengaged position of FIGS. 3, 4 and 5. The slot also permits tangential shifting movement of the pawl 108 between the positions of FIGS. 1 and 3 and the positions of FIGS. 4 and 5. A torsion spring 116 encircles the pivot pin 114 and acts between the housing side wall 16 and the pawl 108 to urge the pawl 108 radially inwardly toward the ratchet wheel 92.

The mounting arrangement of the pawl 108 also includes an E-shaped cutout 118 in the housing side wall 16 which receives the laterally projecting pawl tooth 110. Referring to FIG. 1 it is seen that the cutout 118 permits radial movement of the pawl 108 between the engaged position of FIG. 1 and the disengaged position of FIG. 3 when the pawl 108 is tangentially shifted to the positions shown in FIGS. 1 and 3. However, referring to FIGS. 4 and 5, it is seen that tangential shifting of the pawl 108 from the position of FIG. 3 to the positions of FIGS. 4 and 5 causes the pawl tooth 110 to overlie a shelf 122 of the cutout 118 so that the pawl 108 is blocked against radially inward movement toward the ratchet wheel 92.

OPERATION

Figure 4:
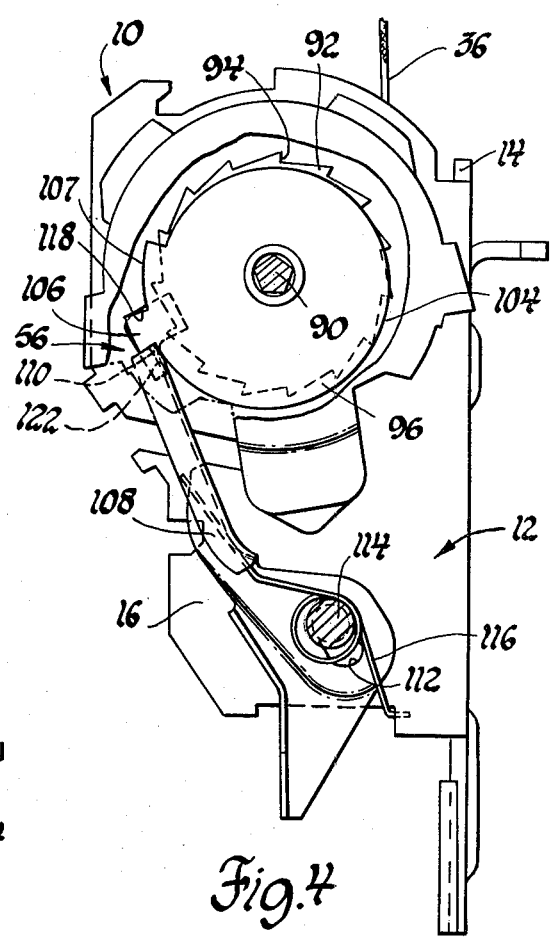
FIG. 4 is a view similar to FIG. 3 but showing the belt having been slightly further unwound and the control disc having shifted the pawl tangentially to a condition in which the pawl is blocked from radial movement toward the ratchet wheel.

Referring to FIG. 4, the retractor is shown in a mode of operation corresponding to the belt 36 having been substantially unwound from the reel 22 to withdraw a length of belt sufficient to permit buckling of the free end of the belt about the occupant. The unwinding rotation causes the control disc abutment 106 to engage the pawl tooth 110 and shift the pawl 108 tangentially in the belt unwinding direction of rotation so that the pawl tooth 110 overlies the shelf 122 of the cutout 118.

Figure 5:
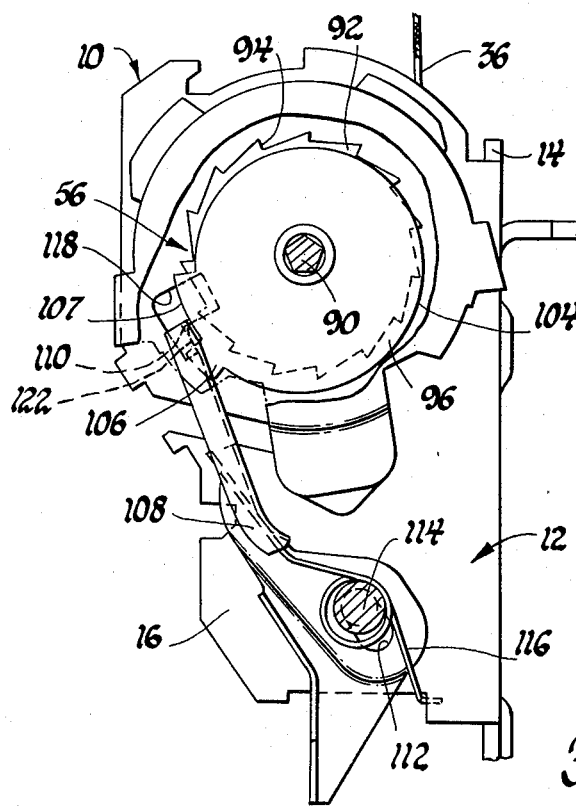
FIG. 5 is a view similar to FIG. 4 but showing the belt substantially rewound from the position of FIG. 4 to carry an abutment of the control disc into engagement with the pawl for tangentially shifting the pawl upon a slight further winding rotation of the reel.

After buckling the belt, there is generally several inches of slack in the belt and the spring 52 rotates the belt reel 22 in the belt winding direction of rotation to retract the belt to a taut condition about the occupant. This belt winding reel rotation causes the control disc 96 to rotate in the clockwise belt winding direction from a position of FIG. 4 to the position of FIG. 5 in which the control disc abutment 106 engages the opposite side of pawl tooth 110. A slight further winding rotation of the reel causes a further rotation of the control disc in the winding direction to shift the pawl 108 tangentially in the winding direction to the position of FIG. 1. However, as best seen in FIG. 5, the blocking portion 107 of the control disc retains the pawl 108 radially outward of the disengaged position relative the ratchet wheel 92. The pawl 108 prevents further rotation of the control disc during any further belt winding rotation of the reel. The control disc annular rib slips on the ratchet plate 92 during any such further belt winding rotation.

The occupant may relieve the tension on the belt 36 by leaning forward or pulling on the belt to unwind the belt. This unwinding of the belt causes the control disc 96 to rotate counterclockwise in the unwinding direction and in so doing rotates the control disc blocking portion 107 from beneath the pawl tooth 110 as seen in FIG. 1 so that the torsion spring 116 is able to pivot the pawl 108 radially inward to engage the ratchet teeth 94. This engagement of the pawl tooth 110 with one of the ratchet teeth 94 prevents belt winding reel rotation by the bias of the spring 52. Accordingly, when the occupant leans back against the seat, an amount of slack remains in the belt and the occupant is relieved of tension that would otherwise be exerted on the chest. The occupant may further unwind the belt from the position of FIG. 1 and the pawl 108 will ratchet progressively over the teeth 94 to introduce additional increments of slack into the belt 36.

After the belt unwinding has progressed through about 180° of reel rotation from the position of FIG. 1, the upward spiral of the cam surface 104 raises the pawl tooth 110 radially outward beyond the tips of the ratchet teeth 94 so that the wind up spring 52 may rotate the reel 22 in the belt winding direction, at least until the pawl tooth 110 catches the first exposed ratchet tooth 94.

Referring to FIG. 4, it is seen that a still further belt unwinding rotation rotates the pawl 108 outwardly beyond the shelf 122 of the cutout 118 and engagement of the control disc abutment 106 with the pawl tooth 110 shifts the pawl 108 laterally tangentially to the position of FIG. 4. Accordingly, the pawl tooth 110 is blocked from radial inward movement by the shelf portion 122 irrespective of a subsequent belt winding rotation which would remove the cam surface 104 from support of the pawl. Accordingly, the winding prevention feature is cancelled and the belt is restored to the continuous tension of the spring 52 until the winding prevention mechanism is reactivated by a substantial rewinding of the belt followed by a slight unwinding of the belt as hereinbefore described.

Thus it is seen that the invention provides a new and improved winding prevention mechanism comprised of a single control disc for moving the pawl radially of the ratchet wheel between engaged and disengaged positions and for moving the pawl tangentially between a limit in the unwinding direction in which the pawl is blocked from radial inward movement and a limit in the winding direction in which the pawl is permitted to move radially toward engagement with the ratchet wheel.

While the invention has been disclosed primarily in terms of the specific embodiment shown in the drawings, it is not intended to be limited thereto but rather only to the extent set forth in the appended claims.

The embodiments of the invention in which an exclusive property or privilege is claimed are defined as follows:

1. In combination, a belt for restraining an occupant, a housing, a reel, a spring urging reel winding to wind the belt, a ratchet carried by the reel, a pawl, means acting between the pawl and housing for mounting the pawl on the housing for radial movement between ratchet engaging and disengaging positions and for tangential shifting movement between limits in the winding and unwinding directions, said mounting means including blocking means blocking radial pawl movement to the engaging position when the pawl is at the unwinding limit, a disc clutched to the reel for rotation therewith and having an abutment adapted to engage with and effect tangential shifting movement of the pawl in the winding direction upon belt winding and in the unwinding direction upon belt unwinding, said disc having a control surface effective to control radial movement of the pawl, said control surface being adapted to permit engagement of the pawl with the ratchet upon belt unwinding subsequent to a prior winding rotation having shifted the pawl to the winding limit to unblock the pawl for movement to the engaged position so that the belt is held at a set slackened length with respect to an occupant, said disc control surface being further adapted to disengage the pawl from the ratchet upon further belt unwinding approaching engagement of the control disc abutment with the pawl to shift the pawl in the unwinding direction upon engagement by the abutment and reestablish blocking of the pawl in the disengaged position by the blocking means during subsequent belt winding and unwinding to restore the winding effort of the spring.

2. In combination, a belt for restraining an occupant, a housing, a reel, a spring urging reel winding to wind the belt, a ratchet carried by the reel, a pawl, pin and slot mounting means acting between the pawl and the housing to mount the pawl for radial movement between ratchet engaging and disengaging positions and for tangential shifting movement in the winding and unwinding directions, blocking means acting between the pawl and the housing to block radial pawl movement to the engaging position when the pawl is shifted tangentially in the unwinding direction, a disc clutched to the reel for rotation therewith and having a control surface controlling radial pawl movement and having an abutment adapted to engage the pawl to shift the pawl tangentially in the winding direction upon predetermined belt winding and in the unwinding direction upon predetermined belt unwinding, said disc control surface including means for effecting engagement of the pawl with the ratchet to hold the belt at a set slackened length with respect to an occupant upon belt unwinding subsequent to a prior belt winding rotation having shifted the pawl tangentially in the winding direction to unblock the pawl for radial movement to the ratchet engaging position, said disc also including means to disengage the pawl from the ratchet upon further belt unwinding whereby upon subsequent belt unwinding the engagement of the control disc abutment with the pawl shifts the pawl tangentially in the unwinding direction to thereby reestablish blocking of the pawl in the disengaged position during subsequent belt winding and unwinding to restore the winding effort of the spring.

* * * * *